United States Patent
Kim et al.

(10) Patent No.: US 8,131,084 B2
(45) Date of Patent: Mar. 6, 2012

(54) APPARATUS FOR IMPROVING SHARPNESS OF IMAGE

(75) Inventors: Joo Hyun Kim, Gyunggi-Do (KR); Bong Soon Kang, Busan (KR); Hyun Soo Kim, Busan (KR); Won Woo Jang, Busan (KR); Kyung Rin Kim, Busan (KR); Won Tae Choi, Gyunggi-Do (KR); Boo Dong Kwak, Gyunggi-Do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 775 days.

(21) Appl. No.: 12/276,091

(22) Filed: Nov. 21, 2008

(65) Prior Publication Data
US 2010/0014771 A1 Jan. 21, 2010

(30) Foreign Application Priority Data
Jul. 18, 2008 (KR) .................. 10-2008-0069919

(51) Int. Cl.
*G06T 5/00* (2006.01)
(52) U.S. Cl. .................. 382/199; 382/263; 382/266
(58) Field of Classification Search .................. 382/199, 382/263, 266
See application file for complete search history.

(56) References Cited

U.S. PATENT DOCUMENTS

| | | | | |
|---|---|---|---|---|
| 5,767,978 A | * | 6/1998 | Revankar et al. | 358/296 |
| 6,668,018 B2 | * | 12/2003 | Pearlstein et al. | 375/240.12 |
| 7,352,896 B2 | * | 4/2008 | Rantanen et al. | 382/167 |
| 7,949,199 B2 | * | 5/2011 | Lin | 382/263 |
| 2008/0001976 A1 | * | 1/2008 | Kim | 345/694 |
| 2008/0199101 A1 | * | 8/2008 | Sumiya et al. | 382/266 |

FOREIGN PATENT DOCUMENTS
JP 2006-037736 A 2/2003
* cited by examiner

*Primary Examiner* — Jon Chang
(74) *Attorney, Agent, or Firm* — Lowe, Hauptman, Ham & Berner, LLP

(57) ABSTRACT

Provided is an apparatus for improving the sharpness of an image. The apparatus includes an edge detector, an effective edge judging unit, an effective edge classifying unit, an isolated edge judging unit, and a 2-D HPF applying unit. The edge detector calculates an edge value using brightness relation with neighboring pixels with respect to each of pixels of an input image. The effective edge judging unit determines effective edge pixels. The effective edge classifying unit determines weak edge pixels and strong edge pixels. The isolated edge judging unit judges an isolated edge pixel included in an isolated edge. The 2-D HPF applying unit applies a first 2-D HPF to the weak edge pixels, and applies a second 2-D HPF to the strong edge pixels to generate edge strengthening values. The edge strengthening value applying unit adds the edge strengthening values to brightness values of the respective pixels of the input image.

7 Claims, 9 Drawing Sheets

APPARATUS FOR IMPROVING SHARPNESS OF IMAGE

CROSS-REFERENCE TO RELATED APPLICATIONS

This application claims the priority of Korean Patent Application No. 2008-69919 filed on Jul. 18, 2008, in the Korean Intellectual Property Office, the disclosure of which is incorporated herein by reference.

BACKGROUND OF THE INVENTION

1. Field of the Invention

The present invention relates to digital image processing, and more particularly, to an apparatus for improving the sharpness of an image, that can naturally improve the sharpness of an image without distortion by applying a 2-dimensional (D) high pass filter (2-D HPF) having an appropriate gain depending on the strength of an edge detected from a digital image.

2. Description of the Related Art

In general, an image sharpness improving technique adopts a method of strengthening the edge component (outline) of an image. For a related art edge strengthening technique improving the sharpness of an image, there exist a method of applying the same 2-D high pass filter (2-D HPF) to an entire image and applying a corresponding edge strengthening value to an original image, and a method of analyzing the characteristics of edges (outlines), applying a 2D HPF suitable for each characteristic, and applying corresponding edge strengthening values to an original image.

The related art method of applying the same 2-D high pass filter (2D HPF) to an entire image can improve the sharpness of the entire image, but applies the 2-D high pass filter to an original image regardless of the strengths of edges of the image. Accordingly, excessive strengthening is applied to a strong edge and so a ringing phenomenon that a white edge is formed in the outline region of an object may be generated, which makes the image unnatural.

In the related art method of analyzing the characteristics of edges (outlines) and applying a 2D HPF suitable for each characteristic, the directionality of an edge such as a horizontal direction, a vertical direction, and no directionality is analyzed, a 2-D HPF suitable for each directionality is generated and applied, and corresponding edge strengthening values are then applied to an input image. In this related art method, various kinds of judgment masks should be used in order to analyze the directionality of each edge, and different kinds of 2-D HPFs are required depending on the directionalities, so that a system may increase in size. Also, since this related art method does not consider the strength of an edge though having an algorithm for judging directionality, a ringing phenomenon may be generated to a strong edge portion. In addition, even when different kinds of 2-D HPFs are applied depending on the directionality of an edge, edge strengthening by the same 2-D HPF is applied to edges having the same directionality, so that it is still difficult to naturally improve sharpness.

SUMMARY OF THE INVENTION

An aspect of the present invention provides an apparatus for improving the sharpness of an image, capable of suppressing generation of a ringing phenomenon and naturally improving the sharpness of the image by judging effective edges that need strengthening depending on the strength of an edge, and applying 2-dimensional (D) high pass filters (HPF) having different gains.

According to an aspect of the present invention, there is provided an apparatus for improving sharpness of an image, the apparatus including: an edge detector calculating an edge value of each pixel of an input image using brightness relation with neighboring pixels; an effective edge judging unit determining, as effective edge pixels, pixels having an edge value between a first threshold value and a second threshold value set in advance among pixels of the input image; an effective edge classifying unit determining, as weak edge pixels, pixels having an edge value smaller than a third threshold value set in advance among the effective edge pixels, and determining, as strong edge pixels, pixels having an edge value greater than the third threshold value among the effective edge pixels; an isolated edge judging unit judging an isolated edge pixel included in an isolated edge among the effective edge pixels; a 2-dimensional (D) high pass filter (HPF) applying unit applying a first 2-D HPF having a first gain to the weak edge pixels excluding the isolated edge pixel, and applying a second 2-D HPF having a second gain smaller than the first gain to the strong edge pixels excluding the isolated edge pixel to generate edge strengthening values of respective pixels; and an edge strengthening value applying unit adding the edge strengthening values to brightness values of the respective pixels of the input image.

The edge detector may apply a mask to the input image to replace a brightness value of a central pixel included in the mask by a maximum brightness value among brightness values of pixels included in the mask, and determine, as the edge value of each pixel, an absolute value of a result obtained by subtracting a brightness value of each pixel of the input image before the mask is applied, from a brightness value of each pixel of the image for which mask application has been completed.

The effective edge judging unit may output a binary image displaying a pixel value of the effective edge pixel using 0 and displaying a pixel value of a pixel that is not the effective edge pixel using 1. The isolated edge judging unit may apply a mask to the binary image to sum pixel values of all pixels included inside the mask, and when the summed value is greater than a fourth threshold value set in advance, judge an effective edge pixel located at a center of the mask as the isolated edge pixel.

The edge strengthening value applying unit may reduce the edge strengthening value at a rate set in advance and apply the reduced edge strengthening value to pixels having brightness greater than a fifth threshold value set in advance among the pixels of the input image.

The apparatus may further include a curve applying unit applying a 1-D control curve for additionally controlling the edge strengthening value output from the 2-D high pass filter applying unit.

The curve applying unit may apply different 1-D control curves depending on a gain of the 2-D high pass filter and a sign of the edge strengthening value.

According to the present invention, since edge strengthening is not performed on excessively strong edge regions and excessively weak edge regions, it is possible to prevent an image from being distorted after sharpness improvement. Particularly, edge sharpening is performed with different gains on strong edge regions and weak edge regions even in regions where edge sharpening is performed, so that unnaturalness generated during image sharpness improvement can be prevented.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
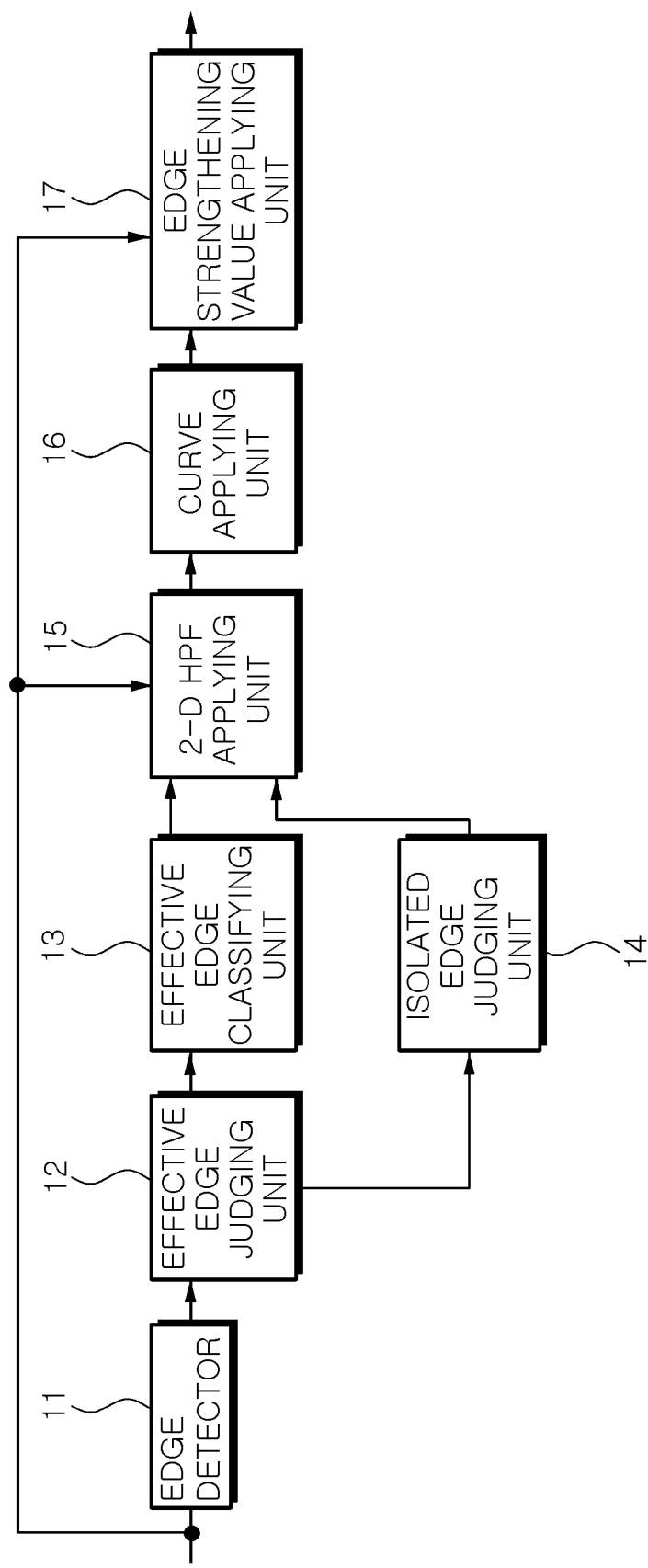
FIG. 1 is a block diagram illustrating an apparatus for improving the sharpness of an image according to an embodiment of the present invention.

Exemplary embodiments of the present invention will now be described in detail with reference to the accompanying drawings. Embodiments of the present invention may, however, can be modified in many different forms, and the scope of the present invention should not be construed as being limited to the embodiments set forth herein. The embodiments of the present invention are provided so that the present invention will be thorough and complete, and will fully convey the concept of the invention to those skilled in the art. Therefore, it is noted that in the drawings, the shape and size of elements may be exaggerated for clarity.

FIG. 1 is a block diagram illustrating an apparatus for improving the sharpness of an image according to an embodiment of the present invention.

Referring to FIG. 1, the apparatus for improving the sharpness of an image according to an embodiment of the present invention includes: an edge detector 11, an effective edge judging unit 12, an effective edge classifying unit 13, an isolated edge judging unit 14, a 2-dimensional (D) high pass filter (HPF) applying unit 15, and an edge strengthening value applying unit 17. The edge detector 11 calculates an edge value using brightness relation with neighboring pixels with respect to each of pixels of an input image. The effective edge judging unit 12 determines, as effective edge pixels, pixels having an edge value included between a first threshold value and a second threshold value set in advance among the pixels of the input image. The effective edge classifying unit 13 determines, as weak edge pixels, pixels having an edge value smaller than a third threshold value set in advance among the effective edge pixels, and determines, as strong edge pixels, pixels having an edge value greater than the third threshold value among the effective edge pixels. The isolated edge judging unit 14 judges an isolated edge pixel included in an isolated edge among the effective edge pixels. The 2-dimensional (D) high pass filter (HPF) applying unit 15 applies a first 2-D HPF having a first gain to the weak edge pixels excluding the isolated edge pixel, and applies a second 2-D HPF having a second gain smaller than the first gain to the strong edge pixels excluding the isolated edge pixel to generate edge strengthening values of respective pixels. The edge strengthening value applying unit 17 adds the edge strengthening values to brightness values of the respective pixels of the input image.

In addition, the apparatus according to the embodiment of the present invention can further include a curve applying unit 16 applying a 1-D control curve for additionally controlling the edge strengthening value output from the 2-D high pass filter applying unit.

Hereinafter, operation and effect of the present invention will be described in more detail through description of respective elements of the present invention with reference to the accompanying drawings.

The edge detector 11 calculates an edge value using brightness relation with neighboring pixels with respect to each of pixels of an input image. Edge value calculation performed at the edge detector 11 can be performed using a Y value, which is a brightness component in a YCbCr coordinate system. For this purpose, an image input to the edge detector 11 may be expressed in terms of a YCbCr coordinate system. When an input image is expressed in terms of signals expressed in an RGB coordinate system, the edge detector 11 can calculate a Y value, which is a brightness component of each pixel included in the input image, using Eq. 1 below.

$$Y=0.257 \times R+0.504 \times G+0.098 \times B+16 \qquad \text{Eq. 1}$$

The edge detector 11 can calculate edge values of all the pixels included in the input image using Y values, which are brightness components of the input image.

Figure 2:
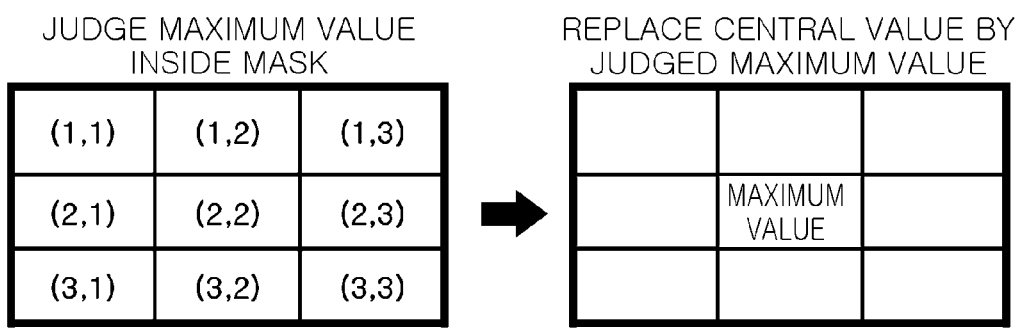
FIG. 2 is a view illustrating an example of a mask applied by the edge detector according to an embodiment of the present invention.

To detect edge values of the pixels included in the input image, the edge detector 11 applies a mask shown in FIG. 2 to all the pixels of the input image. Though FIG. 2 illustrates an example where a 3×3 mask is applied, the mask can be changed in various sizes when needed.

The edge detector 11 applying the mask judges a maximum value among brightness values (Y values) of pixels included inside the mask, and replaces a brightness value of a pixel located in the center of the mask by the judged maximum value.

Figure 3B:
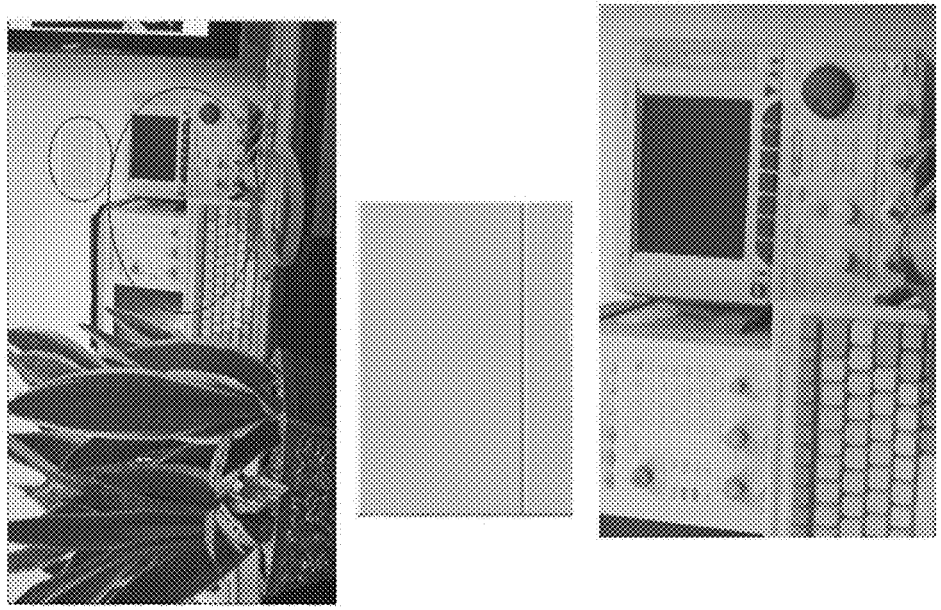
FIG. 3B is a view illustrating an image after a mask is applied by an edge detector according to an embodiment of the present invention.
Figure 3A:
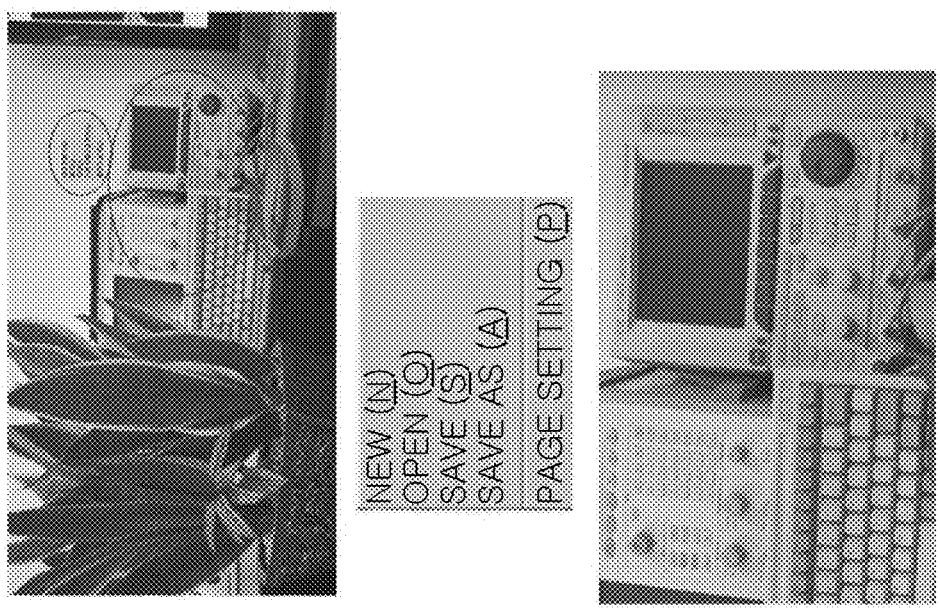
FIG. 3A is a view illustrating an original image before a mask is applied by an edge detector according to an embodiment of the present invention.

When this mask application is performed on an entire image, objects inside the entire image, that are brighter than a neighboring background spread by one pixel on the whole compared to their original sizes, and the background of the objects reduce by the spread amounts of the objects as illustrated in FIG. 3. On the other hand, objects that are darker than a neighboring background reduce by one pixel, and the background spreads by the reduced amount of the objects. When an original image before mask application is subtracted from the above-obtained result, the objects and the background itself have the same brightness value and thus have a value of '0'. Also, a spread portion such as the outline of an object has a value different from that of the original image due to mask application, so that a result value after the subtraction remains.

Figure 4:
FIG. 4 is a view illustrating an image expressed in terms of a pixel value detected by an edge detector according to an embodiment of the present invention.

When an absolute value of the result of the subtraction operation is calculated, an image where a value of '0' (black portion) exists in the inside and the background of the object, and a value greater than '0', that is, an edge value exists in the edge region of the object, can be obtained as illustrated in FIG. 4. For example, as illustrated in Eq. 1, since a Y value, which is a brightness component of an input image, can have a value ranging from about 16 to 235, this edge value can have a value ranging from about 0 to 219. When the mask for detecting this edge value has a small size, the mask can detect an edge value more precisely.

Subsequently, the effective edge judging unit 12 discriminates effective edge pixels that can be judged as actual edges using edge values of respective pixels obtained by the edge detector 11. For example, according to the edge detector 11, pixels of an input image can have a value ranging from about 0 to 219. When an edge value is close to 219, a corresponding edge can be judged as a strong edge having an edge value that shows great difference with respect to neighboring values. On the other hand, when an edge value is close to 0, a corresponding edge can be judged as a weak edge having an edge value that shows small difference with respect to neighboring values. To selectively improve sharpness of only edges that need sharpness improvement, the effective edge judging unit 12 excludes pixels having an excessively large edge value and pixels having an excessively small edge value from an input image when performing an edge strengthening operation. That is, the effective edge judging unit 12 judges that pixels having an edge value smaller than a first threshold value set in advance belong to a smooth region and thus do not need sharpness improvement. Also, the effective edge judging unit 12 judges that pixels having an edge value greater than a second threshold value are already very sharp edges and thus do not need sharpness improvement. The effective edge judging unit 12 determines only pixels having an edge value between the first threshold value and the second threshold value as effective edge pixels to which edge strengthening is to be applied.

Meanwhile, the effective edge judging unit 12 applies a value of '0' to pixels determined as the effective edge pixels, and applies a value of '1' to the rest of the pixels to generate and output a binary image.

Figure 5A:
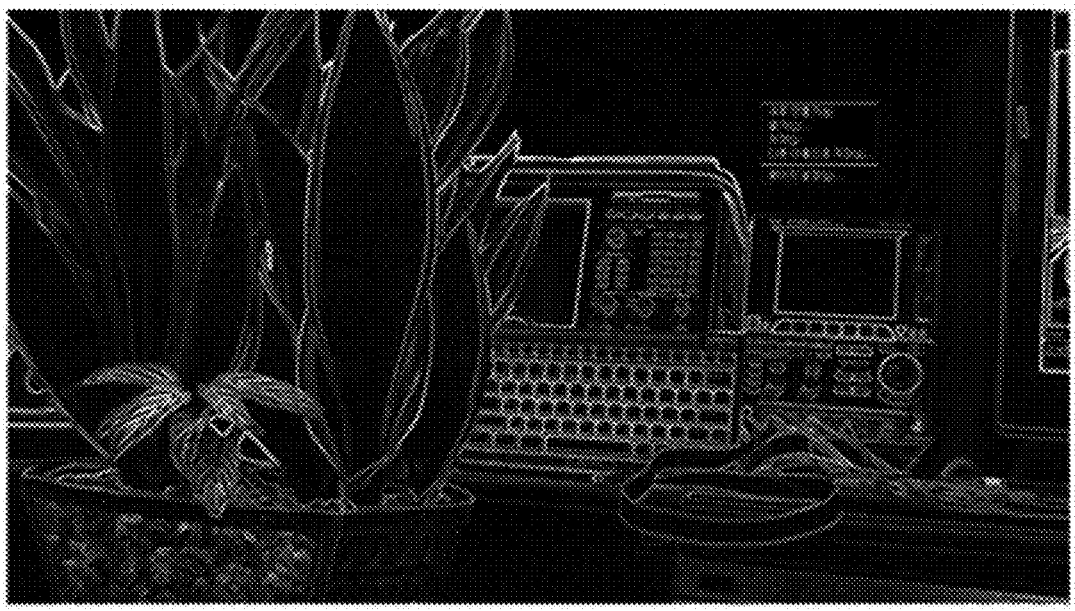
FIG. 5A is a view illustrating an image formed by determination of effective edge pixels performed at an effective edge judging unit according to an embodiment of the present invention.
Figure 5B:
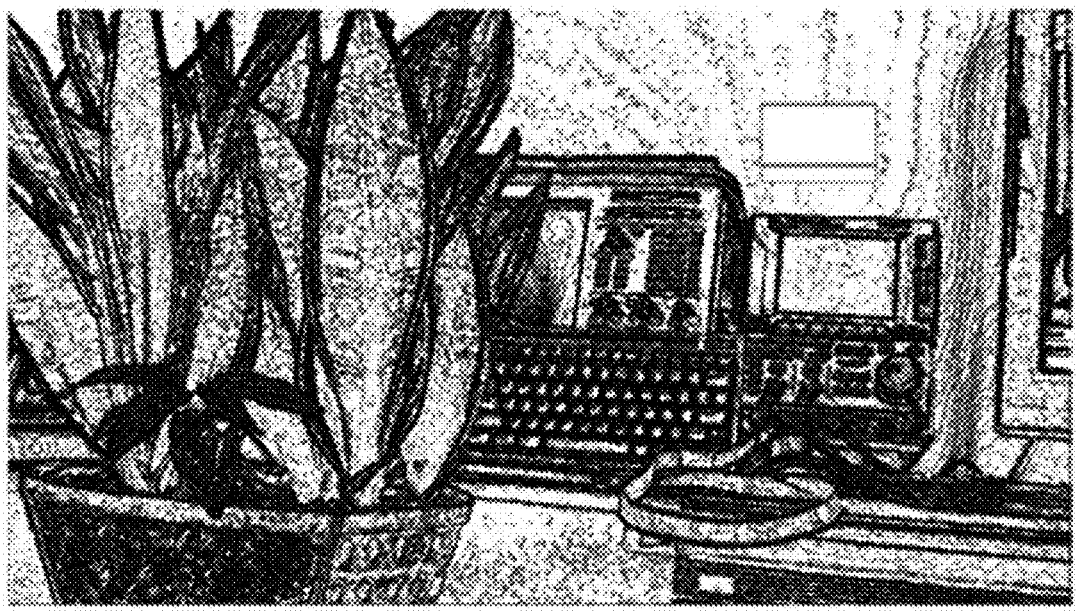
FIG. 5B is a view illustrating a binary image where the effective edge judging unit applies a value of 0 to the effective edge pixels and applies a value of 1 to the rest of pixels according to an embodiment of the present invention.

FIG. 5A is a view illustrating an image formed by determination of the effective edge pixels performed at the effective edge judging unit 12, and FIG. 5B is a view illustrating the binary image.

Figure 6:
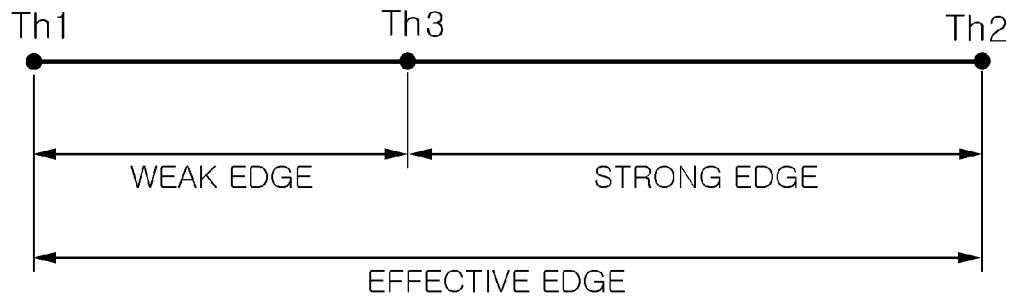
FIG. 6 is a view illustrating a Y-value range of an effective edge pixel, a weak edge pixel, and a strong edge pixel determined by an effective edge judging unit and an effective edge classifying unit according to an embodiment of the present invention.

Next, the effective edge classifying unit 13 classifies the effective edge pixels judged by the effective edge judging unit 12 into two kinds of pixels. For example, the effective edge classifying unit 13 determines effective edge pixels having an edge value smaller than a third threshold value as weak edge pixels, and determines effective edge pixels having an edge value greater than the third threshold value as strong edge pixels. FIG. 6 illustrates an effective edge range, a weak edge range, and a strong edge range depending on a Y value of a pixel. As illustrated in FIG. 6, the effective edge judging unit 12 can determine pixels having a Y value between the first threshold value Th1 and the second threshold value Th2 as effective edge pixels, and the effective edge classifying unit 13 can determine pixels having a Y value between the first threshold value Th1 and the third threshold value Th3 set in advance among the effective edge pixels as weak edge pixels. Also, the effective edge classifying unit 13 can determine pixels having a Y value between the third threshold value Th3 and the second threshold value Th2 as strong edge pixels. The first to third threshold values can be determined by an experimental method.

Instead of applying sharpness improvement of the same amount to all the edges of an input image, the present invention judges the strengths of edges and applies different sharpness improvements depending on the edge strengths. That is, the effective edge classifying unit 13 judges pixels having a relatively strong edge value and pixels having a relatively weak edge value among detected effective edge pixels. Afterward, when applying a 2-D high pass filter, the present invention can apply 2-D high pass filters having a different gain to the strong edge pixels and the weak edge pixels. As described above, the present invention can improve an edge strengthening result even more by applying the 2-D high pass filters suitable for a strong edge characteristic and a weak edge characteristic, respectively.

The isolated edge judging unit 14 judges isolated edge pixels included in an isolated edge among the effective edge pixels. The isolated edge denotes an edge remaining in the form of spots in a smooth region, not an edge of an object inside an image. When edge strengthening is performed with process of the isolated edge omitted, a region such as a noise may exist in a final image on which the edge strengthening has been performed.

Figure 7:
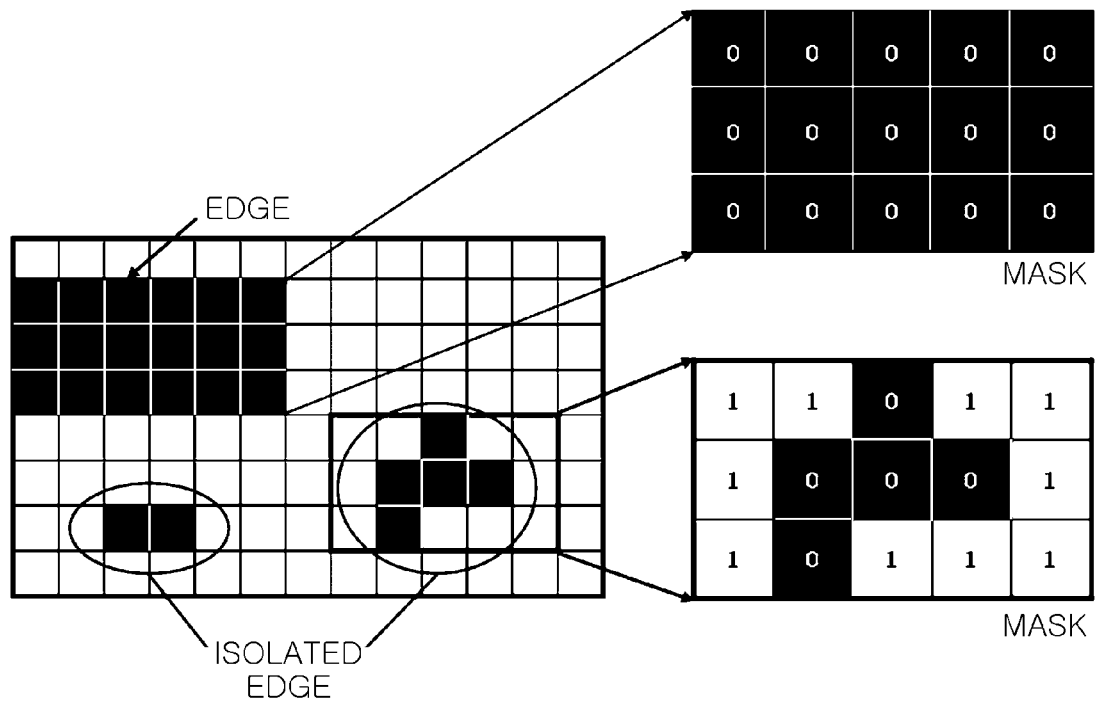
FIG. 7 is a view illustrating a mask used for an isolated edge judging unit to judge an isolated edge according to an embodiment of the present invention.

FIG. 7 is a view illustrating a method for removing an isolated edge. The isolated edge judging unit 14 can remove an isolated edge using a binary image showing the effective edges generated by the effective edge judging unit 12. Referring to FIG. 7, the binary image has a value of '0' for effective edges and a value of '1' for smooth regions, which is the remainder. The isolated edge is characterized in that it is not a continuous edge as in the edge of an object of an image, but is isolated separately and forms an independent group. Most of isolated edges are not distributed by one pixel but form a group without a fixed shape by several pixels. A mask is applied to a binary image using the characteristic of the isolated edge. When sum of pixel values of pixels included inside the mask is greater than a fourth threshold value set in advance, it is judged that an edge is not an edge of an object but an isolated edge existing in the form of a spot.

FIG. 7 illustrates an example where a 3×5 mask is used in order to use much information inside the mask while minimizing use of a line memory. Since it is a binary image, according to a 3×5 mask, sum of pixel values inside the mask can have a value ranging from 0 to 15. The fourth threshold value can be properly determined using a value ranging from 0 to 15. When sum of pixel values inside the 3×5 mask is greater than the fourth threshold value, an effective edge pixel located at the center of the mask is judged as an isolated edge pixel. The pixel value of the pixel judged as the isolated edge pixel is changed from '0' to '1', so that the isolated edge pixel can be regarded as no edge when a 2-D high pass filter is applied afterward. Meanwhile, when the fourth threshold value is close to 15, a degree of detecting an edge such as a spot reduces, but a degree of damaging edges judged for edge strengthening reduces. On the other hand, when the fourth threshold value is close to 0, lots of edges such as a spot can be detected and removed, but edges judged for edge strengthening are also damaged much. Application results of the effective edge classifying unit 13 and the isolated edge judging unit 14 are illustrated in FIG. 8.

Figure 8A:
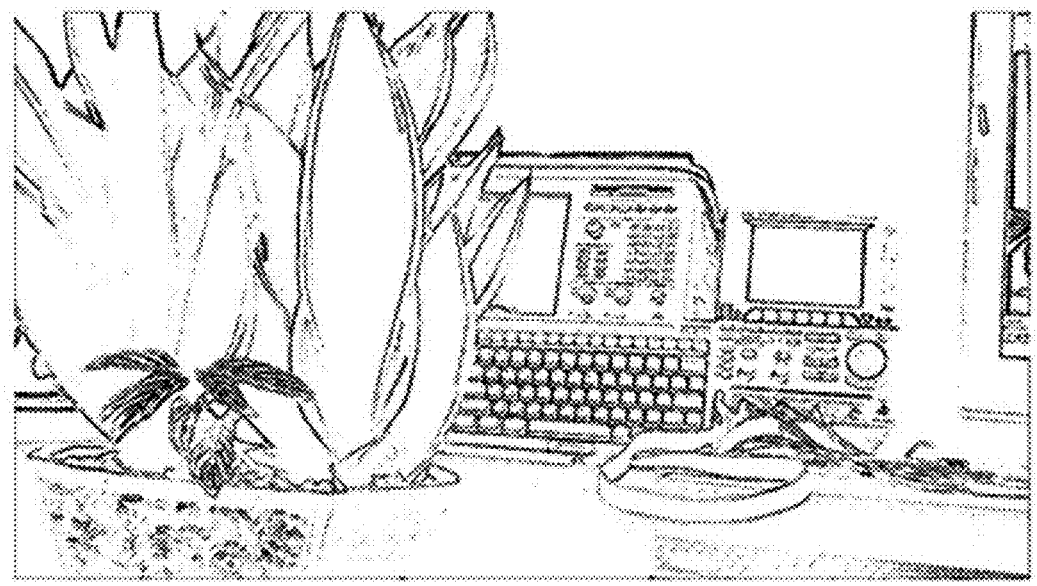
FIG. 8A is a view illustrating an image obtained by removing pixels judged as isolated edges by an isolated edge judging unit from weak edge pixels classified by an effective edge classifying unit according to an embodiment of the present invention.
Figure 8B:
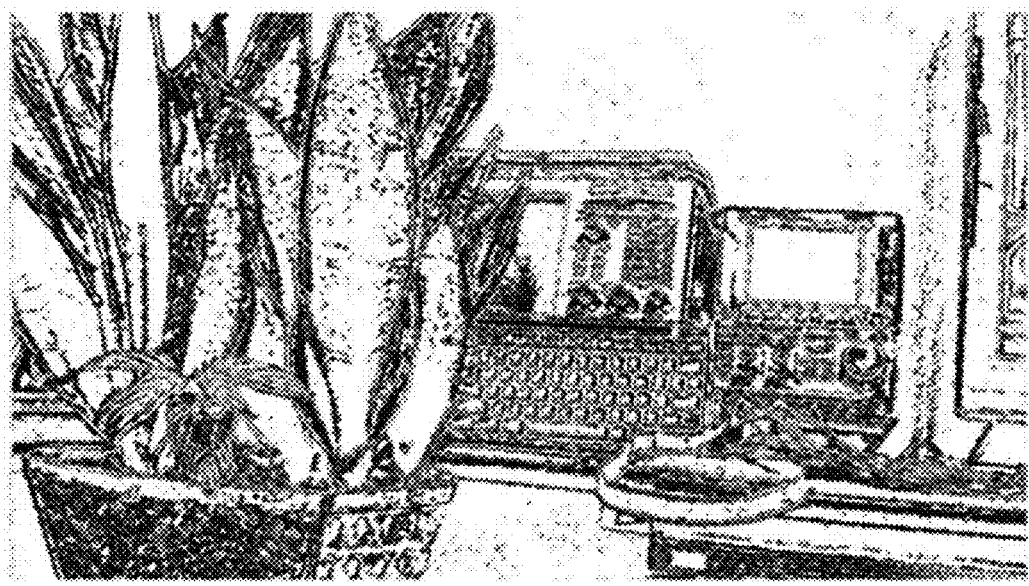
FIG. 8B is a view illustrating an image obtained by removing pixels judged as isolated edges by the isolated edge judging unit from strong edge pixels classified by the effective edge classifying unit.

FIG. 8A is a view illustrating an image obtained by removing pixels judged as isolated edges by the isolated edge judging unit 14 from weak edge pixels classified by an effective edge classifying unit 13, and FIG. 8B is a view illustrating an image obtained by removing pixels judged as the isolated edges from strong edge pixels classified by the effective edge classifying unit 13.

The 2-D high pass filter applying unit 15 applies a first 2-D high pass filter having a first gain to the weak edge pixels excluding the isolated edge pixels of an input image, and applies a second 2-D high pass filer having a second gain smaller than the first gain to the strong edge pixels excluding the isolated edge pixels to generate edge strengthening values for respective pixels.

A reason 2-D high pass filter (HPF) is applied to improve sharpness of an edge is as follows. The high pass filter passes a high frequency region and does not pass a low frequency region. Assuming that a difference degree in a brightness value of an edge pixel of an image compared with those of neighboring pixels is a frequency of the image, when a high pass filter is applied, only brightness values of pixels having a large brightness difference remain in the neighborhood of the edge pixel. Brightness values of pixels having a small brightness difference cannot pass the filter and do not remain. That is, the edge of an original image has a far greater difference compared with the neighboring region by adding the remaining value in the edge region to the original image. Consequently, the sharpness of an image improves. Also, the 2-D filter is applied in order to allow a sharpness improvement degree of the edge to be uniformly applied to the neighboring region. When a 1-D filter is applied, the sharpness of an edge improves in only the direction of the filter, so that sharpness improvement cannot be uniformly applied over the entire region. Therefore, the present invention applies the 2-D filter in order to uniformly improve the sharpness over the entire region.

Figure 9A:
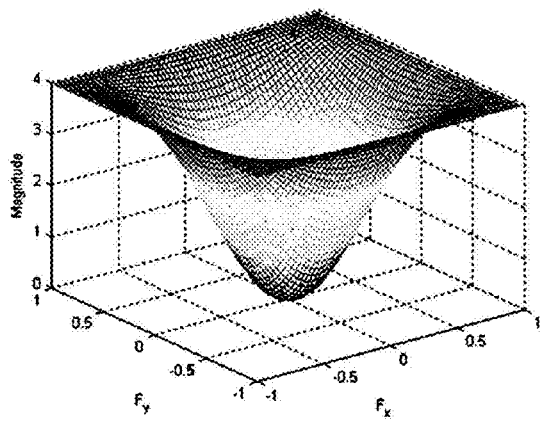
FIG. 9A through FIG. 9D is a view illustrating examples of a 2-D high pass filter used by a 2-D high pass filter applying unit according to an embodiment of the present invention.
Figure 9B:
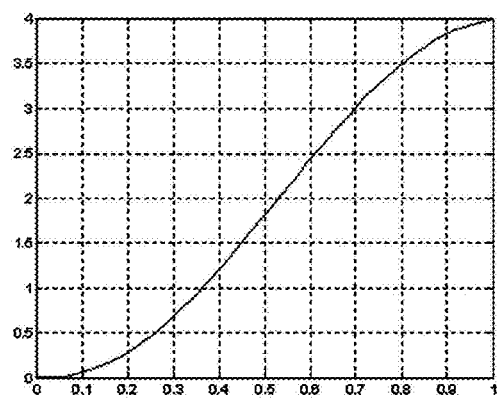
Figure 9C:
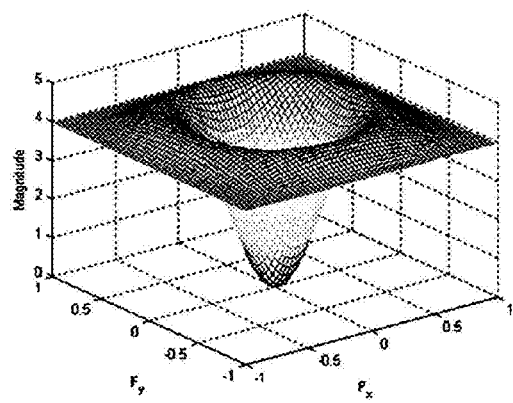
Figure 9D:
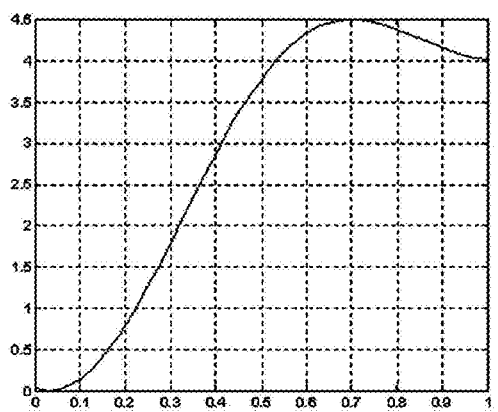

The 2-D high pass filter applying unit 15 applies a filter having a high gain like the filter illustrated in FIGS. 9A and 9B to weak edge pixels, and applies a filter having a small gain like the filter illustrated in FIGS. 9C and 9D to strong edge pixels. The 2-D high pass filter applying unit 15 can increase a degree of edge strengthening by applying the filter having a relatively high gain to the weak edge pixels, and allow a degree of edge strengthening to reduce compared with that of the weak edge pixels by applying the filter having a relatively small gain to the strong edge pixels. In case of applying a 2-D high pass filter having only one gain to all the effective edge pixels, the same level strengthening is applied over the entire region of the image regardless of the strengths of edges, so that a strengthening degree reduces for relatively weak edge pixels and sharpness improvement effect cannot be obtained finally. On the other hand, a strengthening degree of an edge is excessive for strong edge pixels, so that an image distortion phenomenon such as ringing may be generated. According to the present invention, since a suitable filter can be applied depending on the edge strength of each edge pixel, an excellent edge strengthening effect without distortion can be obtained.

The curve applying unit 16 can apply a 1-D control curve for additionally controlling an edge strengthening value output from the 2-D HPF applying unit 15 to the edge strengthening value. The present invention can allow edge strengthening to be performed more naturally by appropriately controlling the size of an edge strengthening value through the curve applying unit 16. An example of the 1-D control curve used by the curve applying unit 16 is illustrated in FIG. 10.

Figure 10:
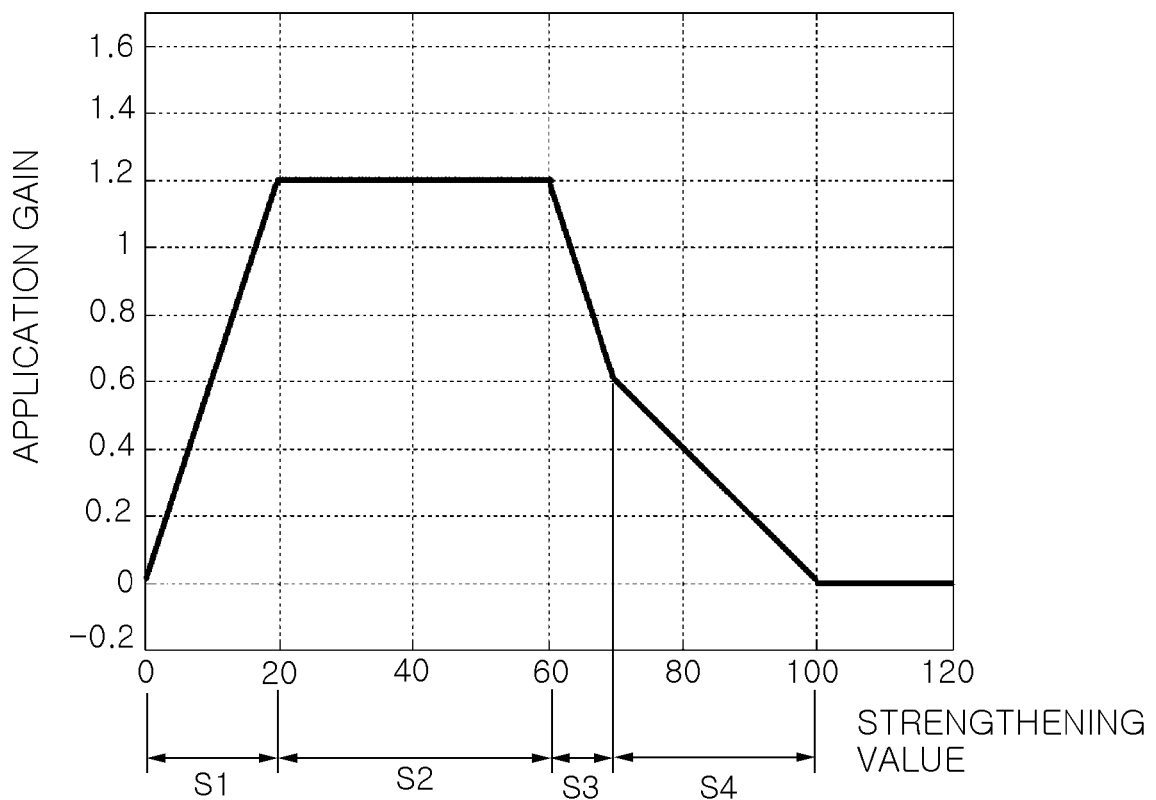
FIG. 10 is a view illustrating an example of a 1-D control curve used by a curve applying unit according to an embodiment of the present invention.

As illustrated in FIG. 10, an X-axis of the curve represents edge strengthening values output from the 2-D HPF applying unit 15, and an Y-axis of the curve represents a gain change with respect to an edge strengthening value to be controlled. For example, when an edge strengthening value generated through 2-D HPF application is a value between 0 and 20 (S1), a gain applied for controlling the edge strengthening value can be linearly applied according to an equation of a line from 0 to 1.2. For example, assuming that an edge strengthening value calculated after passing through the 2-D high pass filter is +20, 1.2 which is a gain controlled by this curve is applied to the edge strengthening value, so that a controlled edge strengthening value of +24 can be finally applied to a corresponding edge pixel. Likewise, when an edge strengthening value generated through 2-D HPF application is a value between 20 and 60 (S2), a controlled edge strengthening value applied by the curve can be applied to a corresponding edge pixel with an additional gain of 1.2. Edge strengthening values controlled through a method similar to the above-described method can be applied to the rest (S3 and S4) of the region. Sections of a 1-D curve applied for controlling the edge strengthening value can be suitably changed by a user.

Meanwhile, when applying the 1-D curve, the same curve can be applied over the entire region of an image, or the region of an image can be subdivided so that a most suitable curve can be individually applied to each region. For example, the region of the image can be subdivided into a region which is judged as strong edge pixels and whose edge strengthening value generated by a 2-D HPF application is a positive value, a region which is judged as strong edge pixels and whose edge strengthening value generated by a 2-D HPF application is a negative value, a region which is judged as weak edge pixels and whose edge strengthening value generated by a 2-D HPF application is a positive value, and a region which is judged as weak edge pixels and whose edge strengthening value generated by a 2-D HPF application is a negative value. Different kinks of curves can be individually applied to the above-described four regions.

Lastly, the edge strengthening value applying unit 17 adds an edge strengthening value determined by the 2-D HPF applying unit 15 or an edge strengthening value controlled by the curve applying unit 16 in an embodiment where the curve applying unit 16 exists to a brightness value of each pixel of the input image to perform final edge strengthening.

The edge strengthening value generated for improving sharpness in order to strengthen an edge in the above-described process is a value judged by the characteristic of a process for improving the sharpness of an input image, and not a value generated by direct influence of the input image. Therefore, to apply an edge strengthening value for improving sharpness to an input image, the following characteristics of the input image may be analyzed and the edge strengthening value may be applied depending on each characteristic. For example, according to an embodiment of the present invention, considering a fact that a region whose brightness component is relatively bright in an input image reacts very sensitively to even a fine value change, application of an edge strengthening value can be controlled depending on the brightness value of the input image.

For example, when the same edge strengthening value as that of the rest regions is applied to a region of an input image, having a brightness value greater than the fifth threshold value, the brightness value of the region drastically changes and so the image may become unnatural. Therefore, the edge strengthening value obtained through the above-described process may be reduced at a rate set in advance and applied to this region.

As described above, since an apparatus for improving the sharpness of an image does not perform edge strengthening on excessively strong edge regions and excessively weak edge regions, it is possible to prevent an image from being distorted after sharpness improvement. Particularly, edge sharpening is performed with different gains on strong edge regions and weak edge regions even in regions where edge sharpening is performed, so that unnaturalness generated during image sharpness improvement can be prevented.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for improving sharpness of an image, the apparatus comprising:
    an edge detector calculating an edge value of each pixel of an input image using brightness relation with neighboring pixels;
    an effective edge judging unit determining, as effective edge pixels, pixels having an edge value between a first threshold value and a second threshold value set in advance among pixels of the input image;
    an effective edge classifying unit determining, as weak edge pixels, pixels having an edge value smaller than a third threshold value set in advance among the effective edge pixels, and determining, as strong edge pixels, pixels having an edge value greater than the third threshold value among the effective edge pixels;
    an isolated edge judging unit judging an isolated edge pixel included in an isolated edge among the effective edge pixels;
    a 2-dimensional (D) high pass filter (HPF) applying unit applying a first 2-D HPF having a first gain to the weak edge pixels excluding the isolated edge pixel, and applying a second 2-D HPF having a second gain smaller than the first gain to the strong edge pixels excluding the isolated edge pixel to generate edge strengthening values of respective pixels; and
    an edge strengthening value applying unit adding the edge strengthening values to brightness values of the respective pixels of the input image.

2. The apparatus of claim 1, wherein the edge detector applies a mask to the input image to replace a brightness value of a central pixel included in the mask by a maximum brightness value among brightness values of pixels included in the mask, and determines, as the edge value of each pixel, an absolute value of a result obtained by subtracting a brightness value of each pixel of the input image before the mask is applied, from a brightness value of each pixel of the image for which mask application has been completed.

3. The apparatus of claim 1, wherein the effective edge judging unit outputs a binary image displaying a pixel value of the effective edge pixel using 0 and displaying a pixel value of a pixel that is not the effective edge pixel using 1.

4. The apparatus of claim 3, wherein the isolated edge judging unit applies a mask to the binary image to sum pixel values of all pixels inside the mask, and when the summed value is greater than a fourth threshold value set in advance, judges an effective edge pixel located at a center of the mask as the isolated edge pixel.

5. The apparatus of claim 1, wherein the edge strengthening value applying unit reduces the edge strengthening value at a rate set in advance and applies the reduced edge strengthening value to pixels having brightness greater than a fifth threshold value set in advance among the pixels of the input image.

6. The apparatus of claim 1, further comprising a curve applying unit applying a 1-D control curve for additionally controlling the edge strengthening value output from the 2-D HPF applying unit.

7. The apparatus of claim 6, wherein the curve applying unit applies different 1-D control curves depending on a gain of the 2-D HPF and a sign of the edge strengthening value.

* * * * *